(12) United States Patent
Hasegawa et al.

(10) Patent No.: US 8,719,615 B2
(45) Date of Patent: May 6, 2014

(54) SEMICONDUCTOR DEVICE

(75) Inventors: Yohei Hasegawa, Kanagawa-ken (JP); Yutaka Yamada, Kanagawa-ken (JP); Takashi Yoshikawa, Kanagawa-ken (JP); Shigehiro Asano, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 347 days.

(21) Appl. No.: 13/064,316

(22) Filed: Mar. 17, 2011

(65) Prior Publication Data

US 2011/0289339 A1   Nov. 24, 2011

(30) Foreign Application Priority Data

May 18, 2010  (JP) ................................. 2010-114441

(51) Int. Cl.
*G06F 1/12* (2006.01)
(52) U.S. Cl.
USPC ............................ 713/503; 713/500; 713/502
(58) Field of Classification Search
None
See application file for complete search history.

(56) References Cited

U.S. PATENT DOCUMENTS

| 8,155,113 | B1* | 4/2012 | Agarwal ....................... 370/386 |
| 2003/0046513 | A1 | 3/2003 | Furuta et al. |
| 2007/0266229 | A1 | 11/2007 | Plondke et al. |
| 2009/0259824 | A1* | 10/2009 | Smith et al. ..................... 712/10 |
| 2013/0024488 | A1 | 1/2013 | Yamada et al. |

FOREIGN PATENT DOCUMENTS

| EP | 1 102 165 | 11/2000 |
| JP | 2001-202241 | 7/2001 |
| JP | 3528922 | 3/2004 |
| JP | 2008-090744 | 4/2008 |
| JP | 2009-536769 | 10/2009 |
| WO | 2007/133893 | 11/2007 |

OTHER PUBLICATIONS

Office Action dated Apr. 17, 2012 in JP application No. 2010-114441with partial English-language translation.
Office Action dated Jan. 22, 2013 in JP application No. 2010-114441with English-language translation thereof.
Seiichi Nisho et al., "High-Performance LSI CAD System", Toshiba Review, vol. 48, No. 7. Jul. 1, 1993, pp. 515-518 with English translation.
Yuji Kanazawa et al., "CAD Tools for Early Timing Closure of System-on-Chip Designs", Fujitsu, vol. 55, No. 6, Nov. 10, 2004, pp. 603-607 with English translation.
Chow et al., The Design of an SRAM-Based Field-Programmable Gate Array—Part I: Architecture, *IEEE Transactions on Very Large Scale Integration*, vol. 7, No. 2, Jun. 1999, pp. 191-197.

* cited by examiner

*Primary Examiner* — Paul Yanchus, III
(74) *Attorney, Agent, or Firm* — Nixon & Vanderhye, P.C.

(57) ABSTRACT

A semiconductor device performs operation in synchronization with a certain clock signal. The semiconductor device includes a control unit for outputting operation control information, a storage unit for storing data, a first operation unit for performing operation on first data in accordance with first operation control information, and a second operation unit for performing operation on second data in accordance with second operation control information. The first operation unit includes a plurality of operation circuits. The number of logic gates constituting the entire operation circuits is m. The second operation unit includes at least one operation circuit in which the number of logic gates is n (n>m). Each of the total delay of the operation unit or the total delay of the operation unit is set at a value equal to or less than the cycle of the clock signal.

19 Claims, 13 Drawing Sheets

SEMICONDUCTOR DEVICE

CROSS REFERENCE TO RELATED APPLICATIONS

This application is based upon and claims the benefit of priority from the prior Japanese Patent Application No. 2010-114441 filed on May 18, 2010; the entire contents of which are incorporated herein by reference.

FIELD

Embodiments described herein relate generally to a programmable semiconductor device.

BACKGROUND

A software-programmable semiconductor device includes a calculation system using a reconfigurable circuit such as an FPGA (Field Programmable Gate Array). The calculation system using the reconfigurable circuit stores circuit information of the reconfigurable circuit to a storage device such as a memory in advance, and reads necessary information during system initialization, thereby making an execution circuit. A calculation system using a dynamic reconfigurable circuit technique has multiple pieces of such circuit information, and reads the necessary circuit information during operation in accordance with a rule defined by a program, thereby making an execution circuit.

In general, the FPGA is a device in which a basic operation element is an LUT (Look-Up Table) handling fine processing data (small number of bits), and the dynamic reconfigurable circuit is a device in which a basic operation element is an operation device handling coarse processing data (large number of bits). These basic operation elements are connected to each other via programmable wires and switching devices, so that various kinds of arithmetic processings can be executed on a single semiconductor device. Accordingly, it is expected to reduce the development cost of dedicated hardware.

The specification of Japanese Patent No. 3528922 describes an array-type processor as a calculation system in which hardware configuration can be changed by software. This array-type processor has such a configuration that many small scale processor elements are arranged in a matrix form, and the hardware configuration can be altered by altering a program. In other words, in this array-type processor, one instruction code is selected for each processor element in accordance with an order defined by the program. Connection relationships between processor elements and arithmetic processings of operation devices are controlled in accordance with the instruction code. As a result, many operation devices can execute complicated arithmetic processings in parallel.

In general, when complicated arithmetic processings are achieved with processor units in synchronization with a clock, operation devices execute simple operation codes over multiple clock cycles, and complicated arithmetic processings are achieved with a combination of simple calculations. An operation device of a processor unit such as a CPU can usually execute only one operation code in a single clock cycle, and therefore, the operation device consumes multiple clock cycles in accordance with, the complexity of the arithmetic processing to be performed. Therefore, when a processor unit such as a CPU executes complicated arithmetic processings at a high speed, the processor has to operate at a high clock frequency, which causes a problem in that the power consumption increases.

A latency of an operation device executing operation supported by the processor unit (delay in the circuit) varies in accordance with the types of operation codes. Accordingly, the circuit operates, using a clock frequency suitable for the most complicated operation circuit (i.e., having the largest latency). In this case, when a simple operation code is executed, the arithmetic processing can only be executed a fewer times than the number of times the operation device can originally execute the arithmetic processing. Accordingly, the original performance cannot be achieved. Therefore, the processor unit operating at a high clock frequency such as a CPU is designed to divide complicated operation codes into multiple clock cycles and execute the instructions. In this method, however, although the performance can be improved, there is a problem that the power consumption increases due to increase of the clock frequency.

On the other hand, in a reconfigurable circuit such as an FPGA, multiple operation elements are cascade-connected with programmable wires and switch devices, whereby complicated arithmetic processing can be achieved with a single clock cycle. Likewise, in the array-type processor described in Patent Document 1, multiple cascade-connected processor elements arranged in a matrix form are connected, so that complicated arithmetic processings can be programmed. As described above, multiple arithmetic processings can be executed in a single clock cycle using multiple operation elements, and therefore, arithmetic processing can be executed at a high speed even with a low clock frequency.

However, in a case of a semiconductor device for achieving complicated arithmetic processings by using software to program connection relationships between operation elements, the clock frequency relies on programmed arithmetic processing taking the longest execution time.

Even with the same software, the execution time varies depending on mapping of operation codes to operation devices and actual result of wirings between operation elements, and this increases the complexity of the control of the clock frequency for each program.

Further, even though many operation elements can operate in parallel, it is difficult to use the same operation element over multiple clocks, which reduces the efficiency of the use of the circuit.

Therefore, a semiconductor device is required capable of altering hardware configuration with software, wherein the clock frequency at which the semiconductor device operates is ensured, and the semiconductor device can efficiently execute arithmetic processing formed with a combination of multiple operation codes.

DETAILED DESCRIPTION

Figure 1:
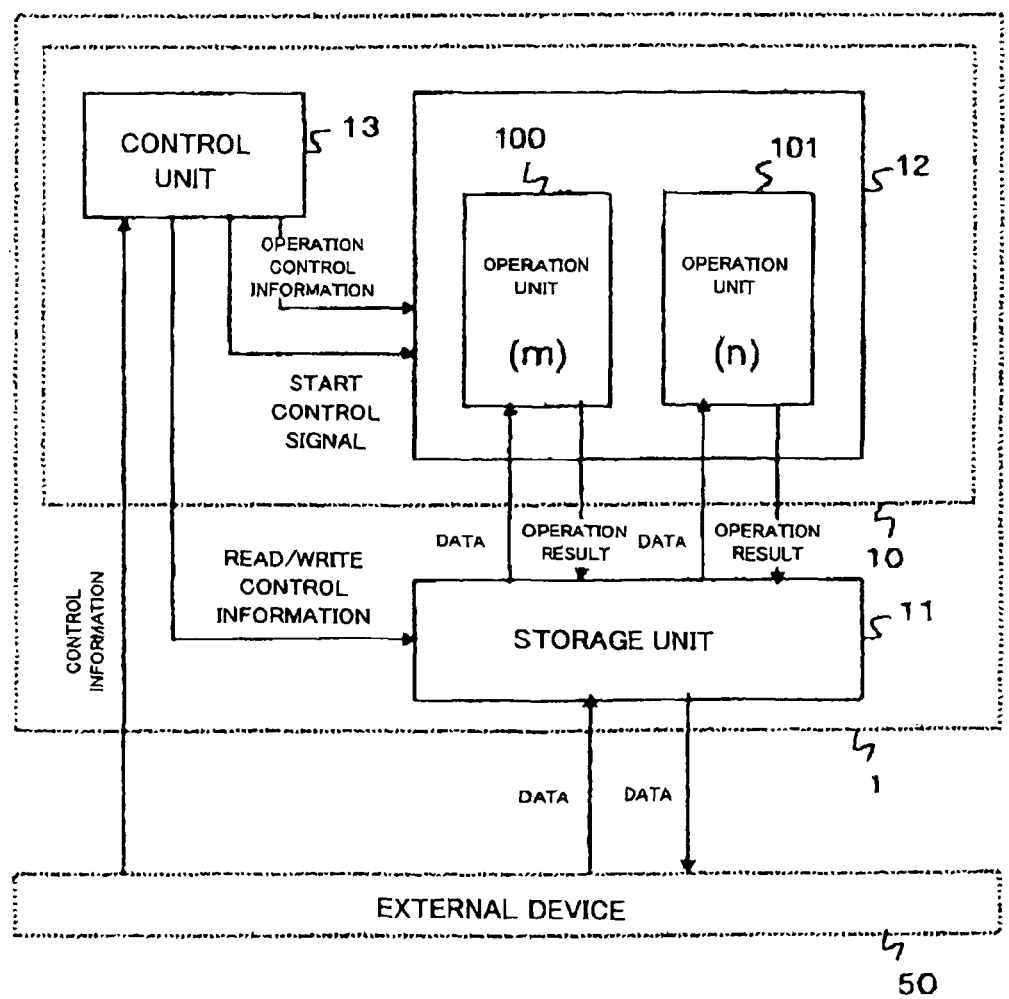
FIG. 1 is a block diagram illustrating an overall configuration of a semiconductor device 1 according to a first embodiment.

A semiconductor device according to one aspect of the present invention is a semiconductor device including a plurality of operation circuits executing operations in synchronization with a clock signal, and the semiconductor device further includes a control unit for outputting first operation control information and second operation control information for controlling operation executed by the plurality of operation circuits; a storage unit for storing first data and second data; a first operation unit operating in synchronization with the clock signal, performing operation on the first data in accordance with the first operation control information, and outputting third data; and a second operation unit operating in synchronization with the clock signal, performing operation on the second data in accordance with the second operation control information, and outputting fourth data, the first arithmetic element including first to M-th (M is an integer of 2 or more) operation circuits connected in series, and are arranged such that an m+1-th (m is an integer equal to or greater than 1 and equal to or less than M−1) operation circuit is configured to perform operation on an operation result provided by a m-th operation circuit, delay indexes representing amounts of delays of the first to M-th operation circuits being $m_1, \ldots, m_M$ ($m_1, \ldots, m_M$ are natural numbers), respectively, the second operation unit including at least an operation circuit delay index of which represents the amount of delay as n (n is an integer of 1 or more), wherein a delay defined based on a summation of delay indexes of the operation circuits provided in the first arithmetic element ($m_1 + \ldots + m_M$) and a delay defined based on the delay index n of the operation circuits provided in the second operation unit are equal to or less than a cycle of the clock signal.

According to the aspect of the present invention, a semiconductor device capable of altering hardware configuration with software is provided, wherein the clock frequency at which the semiconductor device operates is ensured, and the semiconductor device can efficiently execute operation formed with a combination of multiple operation codes.

Embodiments of the present invention will be hereinafter explained in detail with reference to the drawings. In each drawing, the same components are denoted with the same reference numerals, and redundant explanations thereabout are omitted.

[First Embodiment]

FIG. 1 is a figure illustrating a configuration of a semiconductor device according to a first embodiment of the present invention. A semiconductor device 1 includes a processing unit 10 and a storage unit 11, and is connected to an external device 50. The processing unit 10 includes an arithmetic unit 12 and a control unit 13. The semiconductor device 1 performs arithmetic processing in synchronization with a clock signal having a constant clock frequency.

The control unit 13 is connected to the external device 50. The control unit 13 receives control information for controlling operation of the semiconductor device 1 from the external device 50. The control unit 13 interprets the control information and outputs operation control information for controlling operation of the arithmetic unit 12 and read/write control information for controlling operation of the storage unit 11.

The control information is information for controlling operation of the semiconductor device 1, and may be information for identifying a content of operation and an order of operation of the arithmetic unit 12 and the storage unit 13. For example, the control information includes operation control information for identifying a content of arithmetic processing and an order of processing of the arithmetic unit 12 and read/write control information including access information representing read or write operation and address information of the storage unit 13. The control information may include a start control signal later explained.

The control unit 13 reads operation control information indicated by an identifier of operation control information and read/write control information indicated by an identifier of read/write control information in accordance with the identifier of the operation control information and the identifier of the read/write control information included in the control information, and outputs the operation control information to the arithmetic unit 12, and the read/write control information to the storage unit 11. When the control unit 13 finishes output of the operation control information and the read/write control information, the control unit 13 continues the same processing on subsequent control information. The control unit 13 repeats the above processing until the control unit 13 reads control information including information about processing completion from the storage device. The identifier of the operation control information and the identifier of the read/write control information are not particularly limited in terms of form as long as the operation control information and the read/write control information can be identified based on the identifier of the operation control information and the identifier of the read/write control information, respectively. For example, the identifier may be address information of the storage device storing the operation control information and the read/write control information. "Subsequent" operation control information and read/write control information are not particularly limited in terms of form as long as information in a particular order can be selected as intended. For example, when the identifier is the address information, information stored in a subsequent address may be used. Alternatively, subsequent operation control information and subsequent read/write control information may be specified by inserting identifiers of subsequent control information to the operation control information and the read/write control information having been read.

In another example, the control information may be operation control information output from the control unit 13, or may be information including an identifier of read/write control information. Alternatively, the control information may be formed by the very contents of operation control information and read/write control information.

The operation control information may be information for identifying operation of the arithmetic unit 12. For example, the operation control information may be a content of arithmetic processing processed by the arithmetic unit 12 and data selection information used for the arithmetic processing. When the control unit gives operation control information to the arithmetic unit 12, the arithmetic unit 12 selects data needed in the arithmetic processing in accordance with the selection information, and executes arithmetic processing identified by the content of the arithmetic processing. In this case, the data referred to herein is not particularly limited in terms of how it is achieved, as long as the data can be used in the arithmetic processing. For example, the data referred to herein may be data read from the storage unit 11. Alternatively, a previous result of arithmetic processing performed by the arithmetic unit 12 may be stored to an internal register, and this may be used as the data.

The read/write control information may be information for identifying operation of the storage unit 11. For example, the read/write control information is address information used to access the storage unit 11, or access information representing read or write operation to/from the storage unit 11. When the control unit 13 inputs read/write control information to the storage unit 11, the storage unit 11 performs operation identified by access information on a region of the storage unit identified by address information. The operation referred to herein means one of or both of read operation and write operation performed on the region of the storage unit identified by the address information. In this case, the number of accesses that can be processed by the storage unit 11 at a time is not particularly identified. For example, the storage unit 11 may be configured to process two read operations at a time, or may be configured to process one read operation and one write operation at a time.

The arithmetic unit 12 is connected to the control unit 13 and the storage unit 11. When the arithmetic unit 12 receives a start control signal from the control unit 13, the arithmetic unit 12 executes arithmetic processing on the data read from the storage unit 11 in accordance with the operation control information, and outputs output data (operation result) to the storage unit 11. The arithmetic unit 12 executes arithmetic processing indicated by the operation control information in one clock cycle.

The arithmetic unit 12 includes an operation unit 100 performing arithmetic processing in synchronization with the clock signal and an operation unit 101 performing arithmetic processing in synchronization with the clock signal. It should be noted that the arithmetic unit 12 may not directly receive the clock signal. For example, the storage unit 11 may directly receive the clock signal, and the arithmetic unit may perform arithmetic processing in accordance with operation of the storage unit 11. The operation unit 100 includes multiple operation circuits whose delay index is less than a threshold value k (k is an integer of one or more). The complexity of arithmetic processing executed by the operation unit 100 is low. The operation unit 101 includes at least one operation circuit whose delay index is larger than the threshold value k. The complexity of arithmetic processing executed by the arithmetic element 101 is high. The threshold value k is determined according to a design policy of the semiconductor device. The number of operation circuits of the operation unit 100 is larger than the number of operation circuits of the operation unit 101.

The delay index may be an index representing a delay of each operation circuit. In this case, the actually used index is not particularly identified. For example, the delay index of the operation circuit may be represented as the number of logic gates in the operation circuit, latency (delay) of the operation circuit, or the size of the operation circuit executing arithmetic processing. The size of the operation circuit and the latency of the arithmetic processing are measured for each operation circuit (arithmetic processing) on the basis of a particular semiconductor production technique. On the other hand, the number of logic gates in the operation circuit does not rely on any particular semiconductor production technique when the maximum number of gates of logic circuits corresponding to each arithmetic processing is adopted as the index. When actually used semiconductor production technique is identified in advance, the latency of the operation circuit and the size of the operation circuit are more accurate indexes. On the other hand, when the actually used semiconductor production technique is not particularly identified, the number of logic gates in the arithmetic processing is an index having a higher degree of versatility although the number of logic gates in the arithmetic processing is less accurate than the latency of the arithmetic processing and the size of the operation circuit.

In the example explained in the following explanation, the delay index is the number of logic gates in the operation circuit, the operation unit 100 includes two operation circuits in which the number of logic gates is m (m is a natural number equal to or more than 1 but less than k), and the operation unit 101 includes one operation circuit in which the number of logic gates is n (n is a natural number of k or more, and n>m).

The two operation unit 100, 101 can independently operate. Only one of the two operation unit 100, 101 may operate, or both of them may operate. The operation unit 100, 101 may respectively receive two different pieces of data stored in the storage unit 11, or may receive the same pieces of data. The operation unit 100, 101 receive the operation control information from the control unit 13 and data read from the storage unit 11, executes arithmetic processing in accordance with the operation control information, and writes an operation result thereof (output data) to the storage unit 11.

Figure 2:
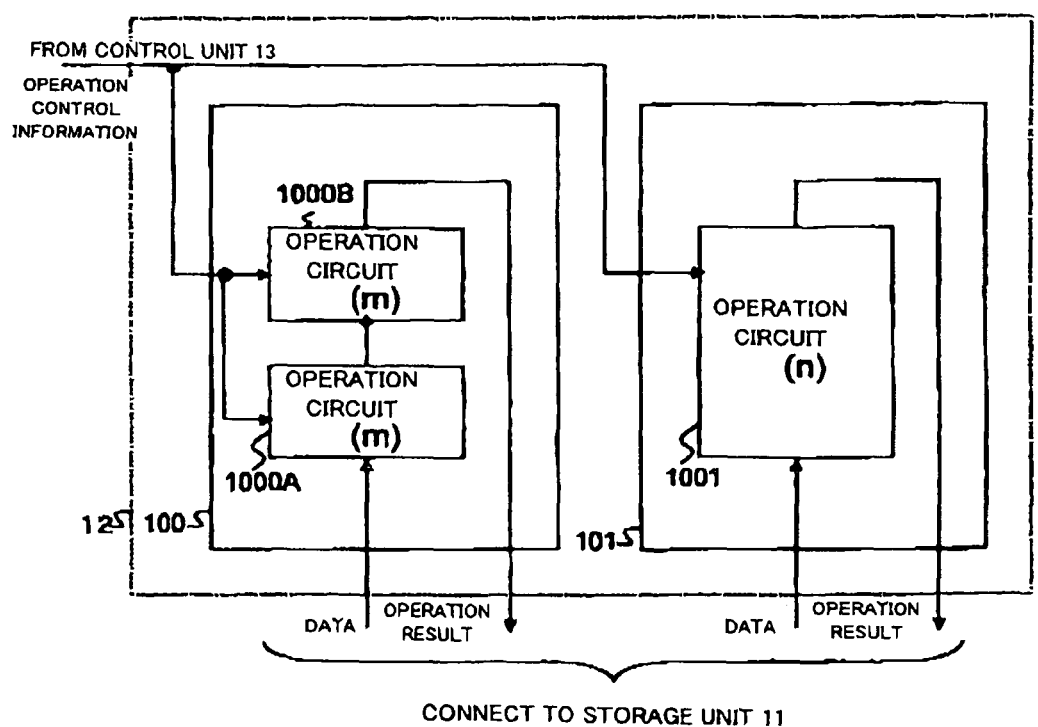
FIG. 2 is a figure illustrating an example of configurations of operation unit 100, 101.

FIG. 2 is a figure illustrating a detailed example of configuration of the arithmetic unit 12. The operation unit 100, 101 have respectively one or more operation circuits actually executing arithmetic processings in accordance with the operation control information. The operation unit 100 have two operation circuits 1000A, 1000B in which the number of logic gates is m (m is a natural number equal to or more than 1 but less than k). The operation unit 101 includes one operation circuit 1001 in which the number of logic gates is n (n is a natural number of k or more, n>m).

Examples of operation codes that can be executed by the operation circuits 1000A, 1000B include basic arithmetic-logic operations performed on data, such as logical sum, logical multiplication, addition and subtractions. Examples of operation codes that can be executed by the operation circuit 1001 include multiplication, division, remainder, and operation for counting the number of zeros in data, which are performed on data. These operations are more complicated than the operation codes that can be executed by the operation circuits 1000A, 1000B.

Figure 3:
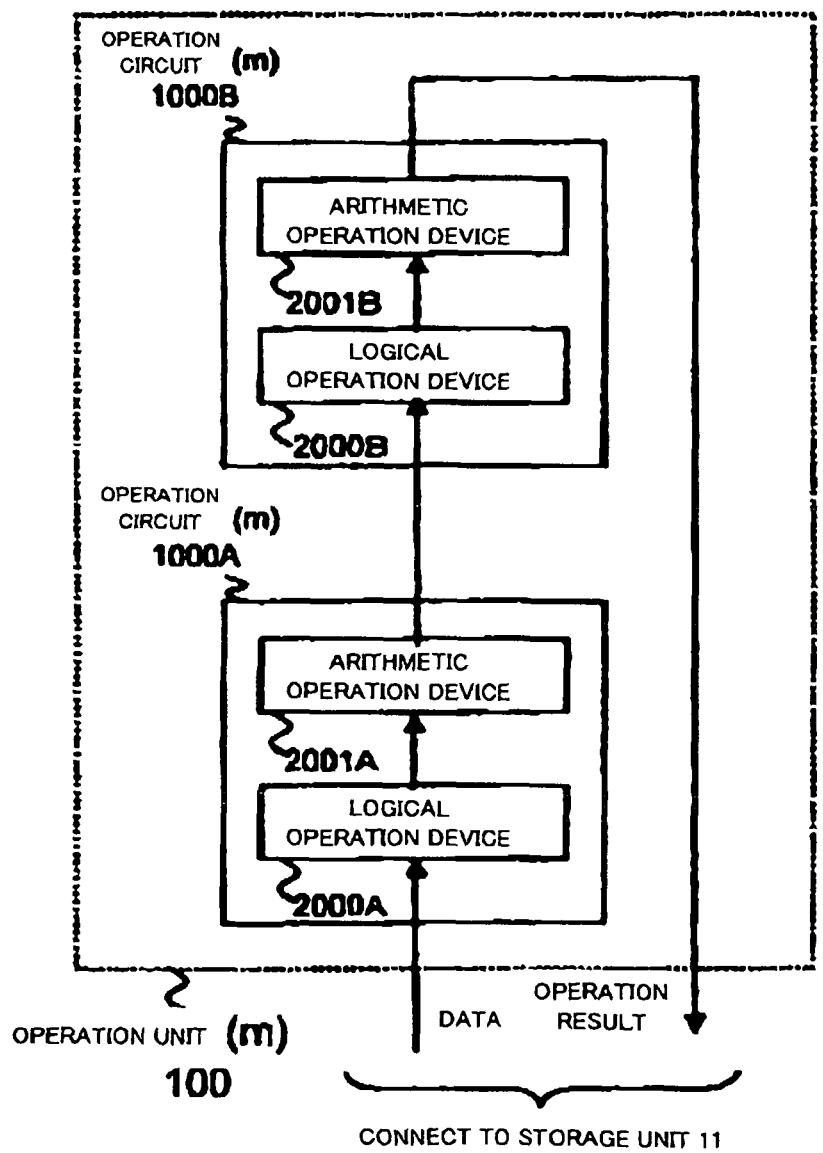
FIG. 3 is a figure illustrating detailed configurations of operation circuits 1000A, 1000B.

FIG. 3 is a figure illustrating examples of configurations of the operation circuits 1000A, 1000B. The operation circuits 1000A, 1000B include logical operation devices 2000A, 2000B for performing logical operations and operation circuits 2001A, 2001B performing shift operation and addition/subtraction. The operation circuits 1000A, 1000B are connected in series. The logical operation device 2000A and the arithmetic operation device 2001A are connected in series. The logical operation device 2000B and the arithmetic operation device 2001B are connected in series.

The operation circuit 1000A executes arithmetic processing on the data read from the storage unit 11 in accordance with the operation control information given by the control unit 13, and provides output data (operation result) to the operation circuit 1000B. The operation circuit 1000B executes an operation code on the output data given by the operation circuit 1000A in accordance with the operation control information given by the control unit 13, and writes output data (operation result) to the storage unit 11.

The data read from the storage unit 11 may be input to the operation circuit 1000A or may be input to the operation circuit 1000B. The data input to the operation circuit 1000A may be input to the logical operation device 2000A, or may be input to the arithmetic operation device 2001A. The data input to the operation circuit 1000B may be input to the logical operation device 2000B, or may be input to the arithmetic operation device 2001B.

The operation circuit 1001 executes an operation code on the data read from the storage unit 11 in accordance with the operation control information given by the control unit 13, and writes output data (operation result) to the storage unit 11.

In the above explanation, the number of logic gates is m in both of the two operation circuits 1000A, 1000B in the operation unit 100. However, the operation circuits may have different numbers of logic gates $m_1$, $m_2$ (each of $m_1$, $m_2$ is a natural number of one or more, and $m_1$, $m_2$<n).

In the semiconductor device 1 according to the present embodiment, a reference value Z defined in advance based on the cycle of the clock signal. In the operation unit 100, 101, multiple operation circuits may be provided in series as long as a summation of delay indexes of the operation circuits connected directly is not more than the reference value Z.

For example, the operation unit 100 may have X operation circuits (X is a natural number of one or more) in which the delay index is less than k, and the operation unit 101 may have operation circuits (Y is a natural number of one or more) in which the delay index is k or more (however, X is equal to or more than Y). However, a summation of delay indexes of X operation circuits in the operation unit 100 and a summation of delay indexes in the operation unit 101 are required to be equal to or less than the reference value Z.

Figure 4:
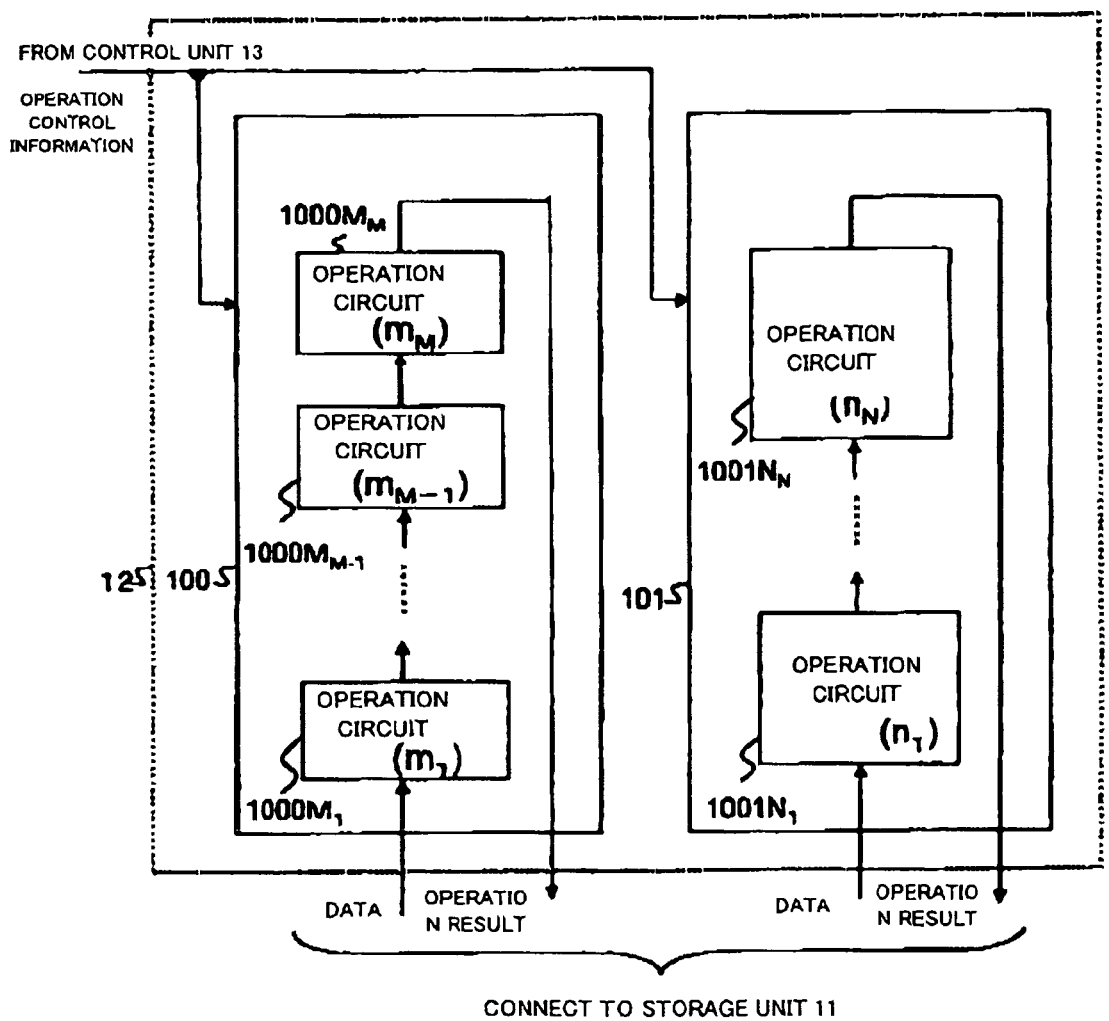
FIG. 4 is a figure illustrating examples of configurations of operation unit 100, 101.

FIG. 4 is a figure illustrating a detailed example of a configuration of the arithmetic unit 12. As shown in FIG. 4, for example, the operation unit 100 may include first to M-th (M is an integer of 2 or more) operation circuits $1000M_1$ to $1000M_M$ having delay indexes $m_1, \ldots, m_M$ ($m_1, \ldots, m_M$ are natural numbers which are equal to or more than one but less than k), and the operation unit 101 may include first to N-th (N is an integer of 1 or more, and N<M) operation circuits $1001N_1$ to $1001N_N$ having delay indexes $n_1, \ldots, n_N$ ($n_1, \ldots, n_N$ are natural numbers of k or more). However, a summation of the delay indexes of the operation circuits provided in the operation unit 100 ($m_1 + \ldots + m_M$) and a summation of the delay indexes of the operation circuits provided in the operation unit 101 ($n_1 + \ldots + n_N$) are equal to or less than the reference value Z. For example, the delay defined based on the summation of the delay indexes of the operation circuits provided in the operation unit 100 ($m_1 + \ldots + m_M$) and the delay defined based on the summation of the delay indexes of the operation circuits provided in the operation unit 101 ($n_2 + \ldots + n_N$) are equal to or less than the cycle of the clock signal (reference value Z).

In the following the example where the delay index is the number of logic gates in the operation circuit, the reference value Z is the maximum number of logic gates Z. The maximum value Z of the number of logic gates in the operation circuit for achieving the arithmetic unit 12 (hereinafter referred to as the maximum number of logic gates Z) is defined in advance. In the operation unit 100, 101, multiple operation circuits can be arranged in series so that the number of logic gates does not exceed this value Z. The maximum number of logic gates is a value defined according to the clock frequency of the semiconductor device 1, and is the number of logic gates that can be processed within the cycle of the clock signal.

The storage unit 11 stores data used by the arithmetic unit 12 for arithmetic processing, intermediate results of arithmetic processing performed by the arithmetic unit 12, and final results of arithmetic processing. The data used for the arithmetic processing performed by the arithmetic unit 12 may be transferred from the external device 50 and written to the storage unit 11. The arithmetic unit 12 may use the intermediate result of the arithmetic processing stored in the storage unit 11 again as an input, and may continue arithmetic processing over multiple clock cycles. The final result of the arithmetic processing of the arithmetic unit 12 stored in the storage unit 11 may be read by the external device 50.

Figure 5:
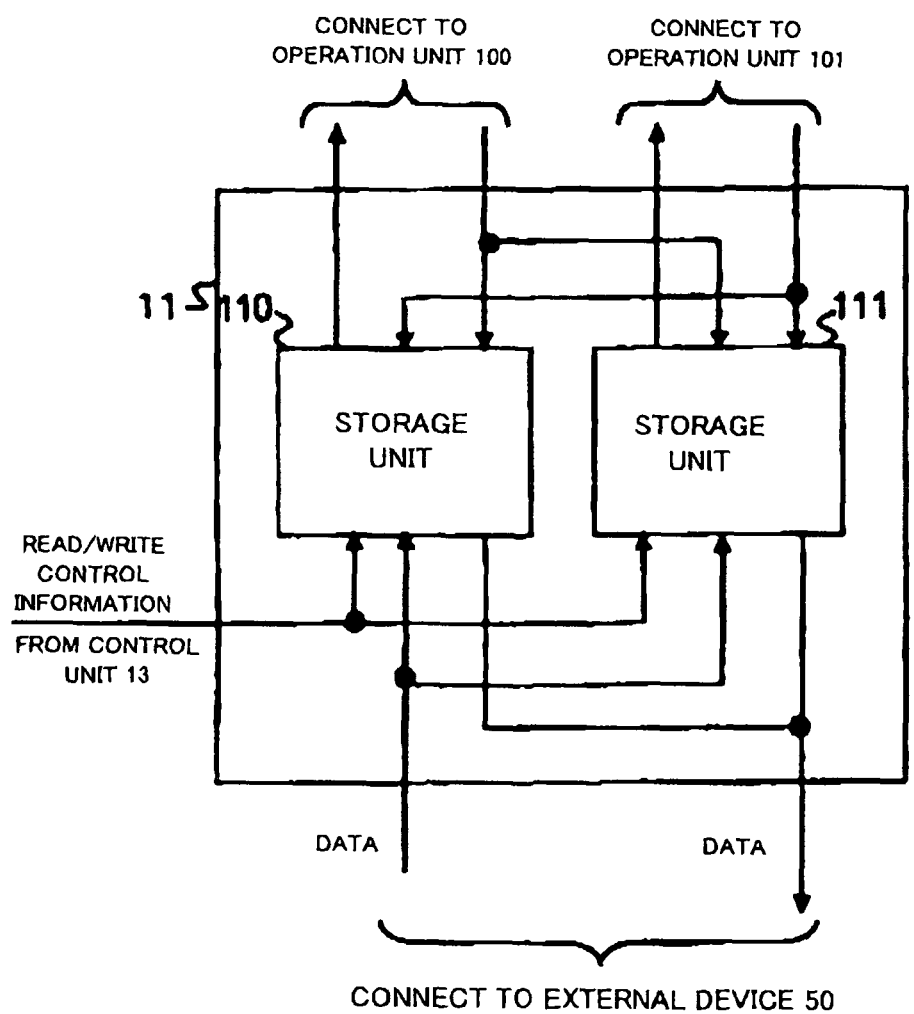
FIG. 5 is a figure illustrating an example of an internal configuration of a storage unit 11 according to the first embodiment.

FIG. 5 illustrates a detailed internal configuration of the storage unit 11. The storage unit 11 includes storage elements 110, 111. The read/write control information includes access information representing read or write operation to/from the storage elements 110, 111 and address information. When the storage elements 110, 111 receive access information representing read operation, data stored in a region specified by the address information are read. When access information representing write operation is received, the operation result provided by the operation unit 100, 101 is written to a region specified by the address information.

When the storage unit 11 receives a read request from the external device 50, the storage unit 11 reads data from a specified address in synchronization with the clock signal, and outputs the data to the external device 50. When the storage unit 11 receives a write request from the external device 50, the storage unit 11 writes data transmitted from the external device 50 to a specified address in synchronization with the clock signal.

The storage unit 11 receives a clock signal, read/write control information from the control unit 13, and an operation result given by the arithmetic unit 12. When the read/write control information includes access information representing read operation, the storage unit 11 reads data in synchronization with the clock signal, and transfers the data to the arithmetic unit 12. When the read/write control information includes access information representing write operation, the operation result transferred from the arithmetic unit 12 is written in synchronization with the clock signal.

When the external device 50, the control unit 13, and the arithmetic unit 12 access the storage unit 11 at a the same time, hardware for arbitrating multiple accesses to the storage unit may be prepared to dynamically avoid conflicting accesses. Alternatively, instead of arranging such mechanism, accesses may be statically controlled by software so as to prevent conflicting accesses.

Figure 6:
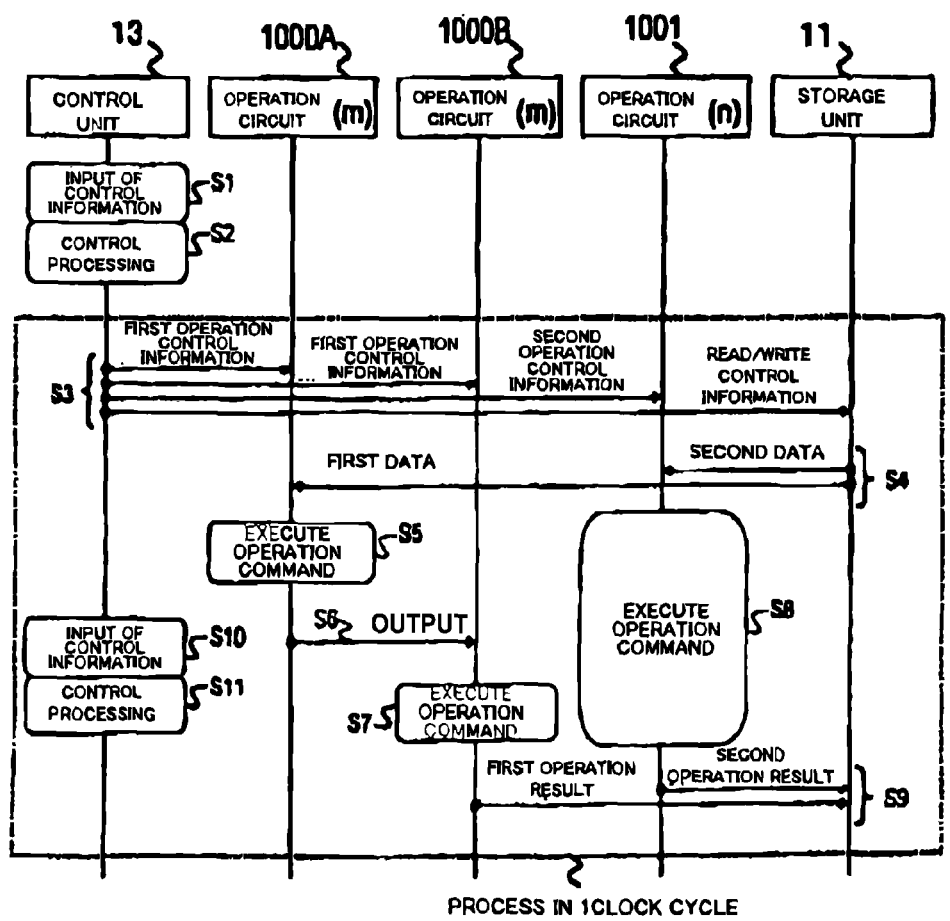
FIG. 6 is a sequence diagram illustrating operation of each element in the semiconductor device 1 according to the first embodiment.

A flow of operation of the semiconductor device 1 according to the first embodiment as shown in FIG. 1 will be explained with reference to the drawings. FIG. 6 is a sequence diagram when the semiconductor device 1 executes certain operation processing. First, the control unit 13 receives control information for controlling arithmetic processing from the external device 50 (S1), and performs control processing such as interpretation of the control information (S2). Then, as a result of control processing, the control unit 13 outputs first operation control information, second operation control information, and read/write control information. Then, the control unit 13 outputs the first operation control information to the operation unit 100, and outputs the second operation control information to the operation unit 101, and outputs the read/write control information to the storage unit 11 (S3). The storage unit 11 reads first data needed in arithmetic processing performed by the operation unit 100 and second data needed in arithmetic processing performed by the operation unit 101 in accordance with the read/write control information, and outputs the first data to the operation circuit 1000A of the operation unit 100, and outputs the second data to the operation circuit 1001 (S4). The operation circuit 1000A receives the first data as an input, and executes arithmetic processing defined in the first operation control information (S5), and outputs an operation result to the operation circuit 1000B (S6). The operation circuit 1000B receives the output given by the operation circuit 1000A as an input, and executes arithmetic processing defined in the first operation control information (S7). Likewise, the operation circuit 1001 receives the second data as an input, and executes arithmetic processing defined in the second operation control information (S8). In this case, each of the processings performed in steps S5 and S7 is simpler than the processing performed in step S8. A summation of processing times of the processings performed in steps S5 and S7 is less than a summation of the processings performed in step S8. Therefore, the operation unit 100 can perform S5 and S7 while the operation unit 101 performs S8. The operation circuit 1000B outputs an operation result (which will be referred to as first operation result) to the storage unit 11, and the operation circuit 1001 outputs an operation result (which will be referred to as second operation result) to the storage unit 11 (S9). Then, each of the first operation result and the second operation result is written to the storage unit 11 in accordance with the read/write control information. When there is subsequently-executed processing, the control unit 13 receives, as an input, control information corresponding to subsequently-executed arithmetic processing from the external device 50 (S10), and performs control processing such as interpretation of the control information (S11). Therefore, the processing time can be reduced. In the present embodiment, steps S3 to S11 are executed in a single clock cycle (processings executed in a single clock cycle are shown by a dotted line in FIG. 6.).

With the above structure, the arithmetic processing achieved by a combination of two simple arithmetic processings can be executed in one clock cycle without being divided into multiple clock cycles. Therefore, the arithmetic processing can be executed efficiently with low power consumption. Further, the arithmetic unit for processing operation of a low degree of complexity and the arithmetic element for processing operation of a high degree of complexity are provided, and the arithmetic unit for processing operation of a low degree of complexity is configured such that multiple operation circuits with a few logic gates are cascade-connected, wherein the number of logic gates is not more than the previously defined maximum number of logic gates Z. Therefore, the execution times of various arithmetic processings are balanced, and the efficiency of use of the operation devices can be improved. Further, since the arithmetic units are configured while the number of logic gates is not more than the previously defined maximum number of logic gates Z, the clock frequency at which the semiconductor device 1 operates can be guaranteed to be a constant value.

In the flow of operation performed by the semiconductor device 1 as described above, the control unit 13 outputs the first operation control information and the second operation control information as the operation control information in step S3. Alternatively, the control unit 13 may output only one of the first operation control information and the second operation control information. In this case, only one of the operation unit 100 and the operation unit 101 may operate.

Subsequently, a more detailed example of a configuration of an internal configuration of the storage unit 11 will be explained.

As shown in FIG. 5, the storage unit 11 includes the storage unit 110 storing data (first data) looked up by the operation unit 100 and the storage unit 111 storing data (second data) looked up by the operation unit 101.

The output of the storage unit 110 is connected to the input of the operation unit 100. The output of the storage unit 111 is connected to the input of the operation unit 101.

The operation unit 100 can look up the first data in the storage unit 110 in accordance with read/write control information given to the storage unit 110 from the control unit 13. On the other hand, the operation unit 101 can look up the second data in the storage unit 111 in accordance with read/write control information given to the storage unit 111 from the control unit 13. As described above, the storage elements are provided for the corresponding arithmetic units. This configuration enables the arithmetic units to independently look up data at a time and enables the arithmetic units to perform processings in parallel.

The outputs of the operation unit 100 and 101 are connected to the inputs of both of the storage elements 110 and 111.

With this configuration, the operation unit 100 can write first operation result, i.e., a result of arithmetic processing performed by the operation unit 100, to both of or one of the storage elements 110, 111 in accordance with the read/write control information given to the storage unit 11 from the control unit 13. On the other hand, the operation unit 101 can write second operation result, i.e., a result of arithmetic processing performed by the operation unit 101, to both of or one of the storage elements 110, 111 in accordance with the read/write control information given to the storage unit 11 from the control unit 13.

As described above, the operation results of the operation unit 100 and the operation unit 101 can be written to both of the storage unit 110 and the storage unit 111. Therefore, the operation unit 100 can perform arithmetic processing using the operation result of the operation unit 101, the operation unit 101 can perform arithmetic processing using the operation result of the operation unit 100. In other words, data can be exchanged between the operation unit 100, 101, and this enables more flexible arithmetic processing.

It should be noted that the number of pieces of information that can be written to the storage elements 100, 101 at a time is not limited. Therefore, both of the received operation results of the operation unit 100, 101 may be written at a time, or a selector may be provided to write only one of them.

Figure 7:
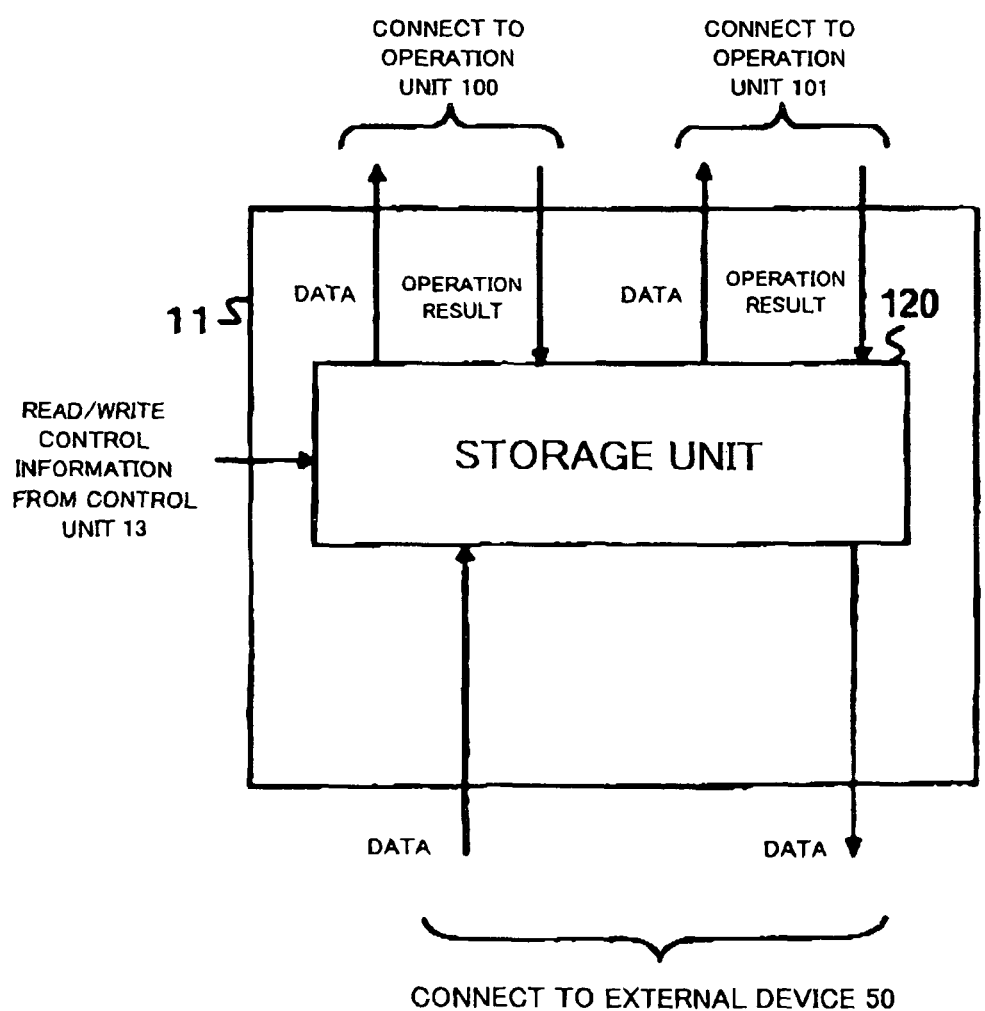
FIG. 7 is a figure illustrating a modification of an internal structure of the storage unit 11 according to the first embodiment.

FIG. 7 is a figure illustrating a modification of an internal structure of the storage unit 11. The storage unit 11 of FIG. 7 is configured to include only one storage element 120.

The storage element 120 stores data (first data) looked up by the operation unit 100 and data (second data) looked up by the operation unit 101.

The inputs and the outputs of the operation unit 100 and 101 are connected to the storage element 120.

The operation unit 100 can look up the first data in the storage unit 110 in accordance with read/write control information given to the storage element 120 from the control unit 13. On the other hand, the operation unit 101 can look up the second data in the storage element 120 in accordance with read/write control information given to the storage element 120 from the control unit 13.

The operation unit 100 can write first operation result, i.e., a result of arithmetic processing performed by the operation unit 100, to the storage element 120 in accordance with the read/write control information given to the storage element 120 from the control unit 13. On the other hand, the operation unit 101 can write second operation result, i.e., a result of arithmetic processing performed by the operation unit 101, to the storage element 120 in accordance with the read/write control information given to the storage element 120 from the control unit 13.

As described above, the storage element 120 is shared by the operation unit 100, 101. Therefore, the size of the storage unit can be reduced, and the power consumption can be reduced.

Moreover, since the operation results of the operation unit 100 and the operation unit 101 can be written to the single shared storage element 120, the operation unit 100 can perform arithmetic processing using the operation result of the operation unit 101, the operation unit 101 can perform arithmetic processing using the operation result of the operation unit 100. In other words, data can be exchanged between the operation unit 100, 101, and this enables more flexible arithmetic processing.

Figure 8:
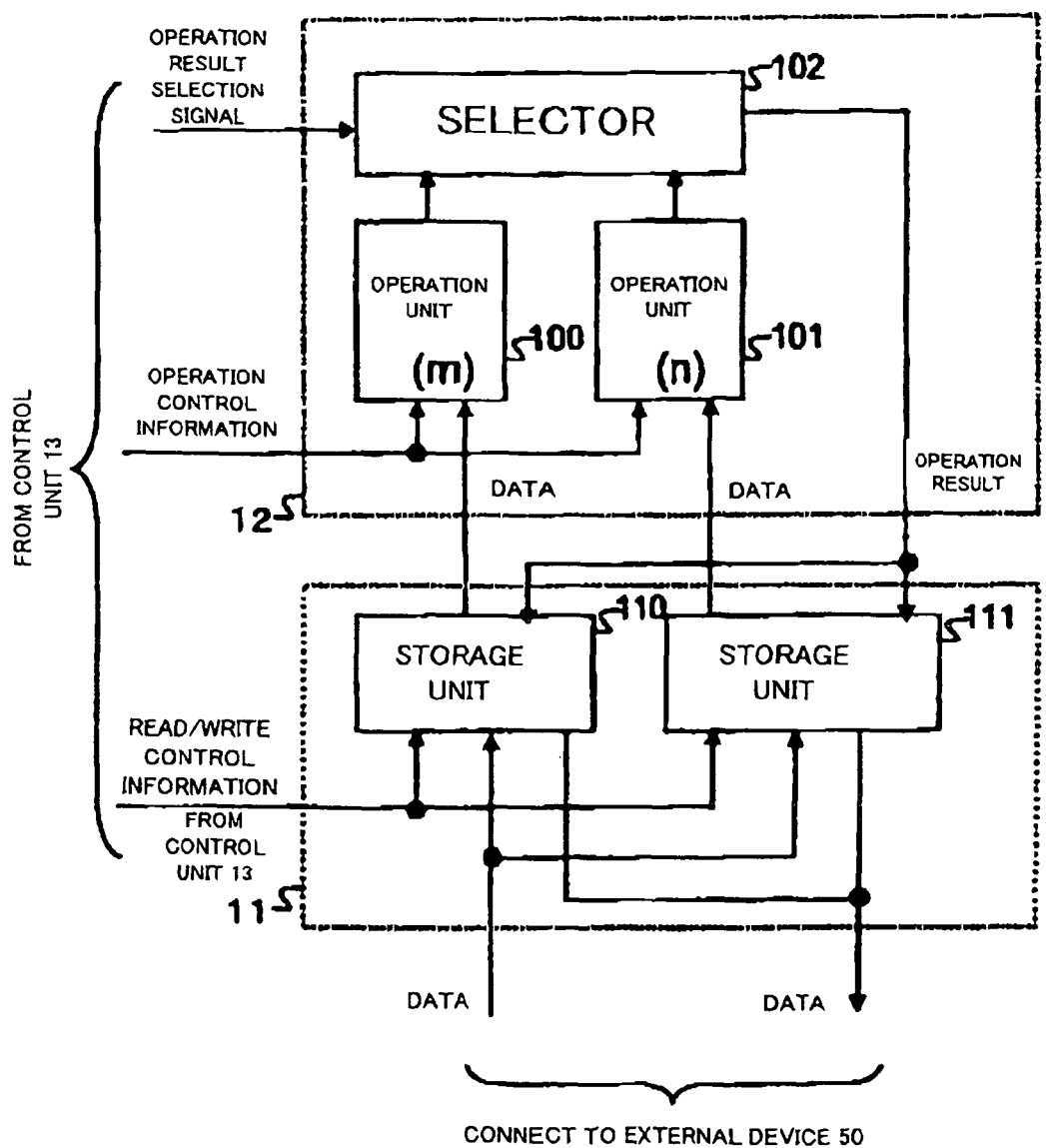
FIG. 8 is a block diagram illustrating a modification of an arithmetic unit 12 according to the first embodiment.

FIG. 8 is a figure illustrating a modification of an internal structure of the storage unit 12. An arithmetic unit 12 of FIG. 8 further includes a selector 102 for selecting any one of operation results of operation unit 100, 101.

The outputs of the operation unit 100, 101 are connected to the selector 102. The output of the selector 102 is connected to a storage unit 110 and a storage unit 111.

The operation unit 100 can look up the first data in the storage unit 110 in accordance with read/write control information given to the storage unit 110 from the control unit 13. On the other hand, the operation unit 101 can look up the second data in the storage unit 111 in accordance with read/write control information given to the storage unit 111 from the control unit 13. As described above, the storage elements are provided for the corresponding arithmetic units. This configuration enables the operation unit to independently look up data at a time and enables the operation unit to perform processings in parallel.

On the other hand, the outputs of the operation unit 100 and 101 are output to the selector 102.

The selector 102 receives an operation result selection signal included in the operation control information provided from the control unit 13 and the operation results of operation unit 100, 101, selects one of the operation results specified by the operation result selection signal, and outputs the operation result to one of or both of the storage unit 110 and the storage unit 111.

The storage elements 110, 111 respectively receive the output of the selector 102 and the read/write control information provided from the control unit 13, and write the output of the selector 102 in accordance with the read/write control information.

Since the internal configuration of the arithmetic unit 12 is configured as described above, only one of the arithmetic processings performed by the operation unit 100, 101 of the arithmetic unit 12 is enabled, and the power consumption can be reduced by halting signal transition of the disabled arithmetic unit.

Figure 9:
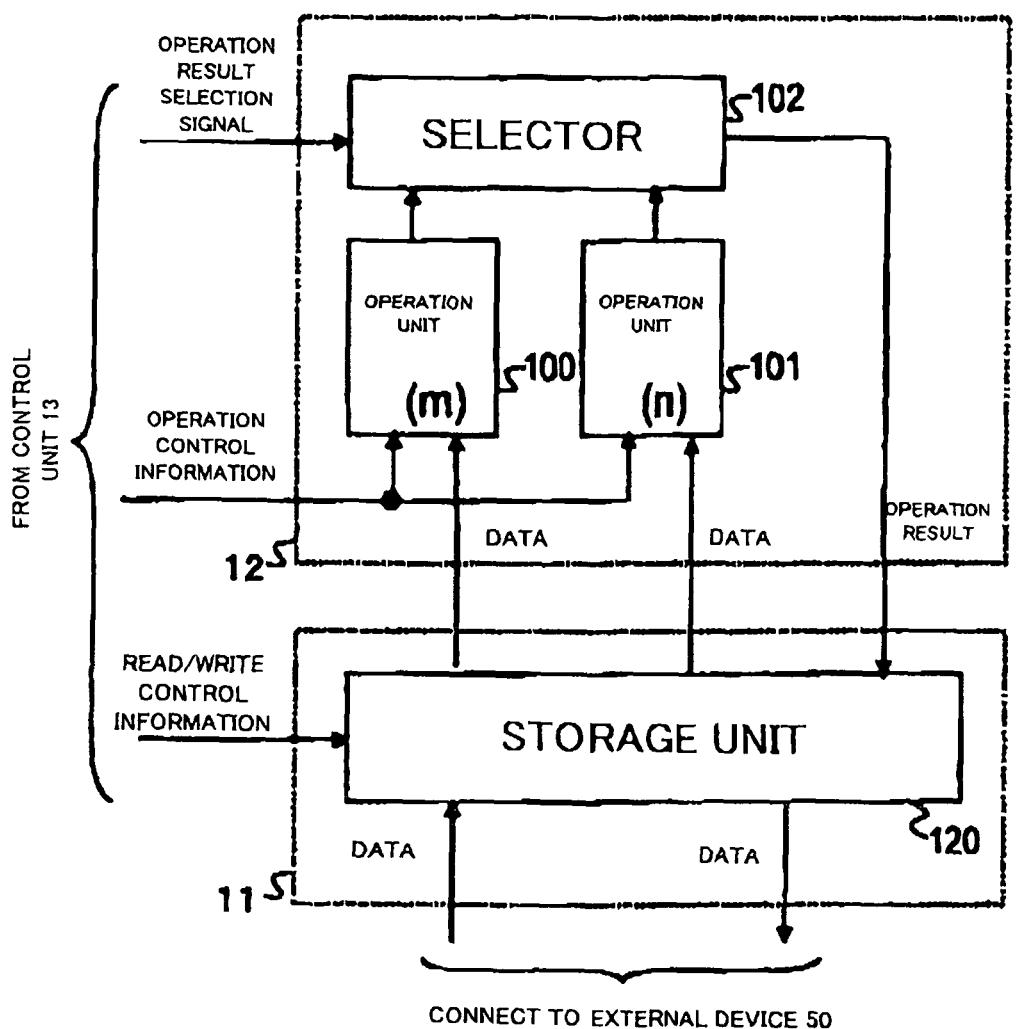
FIG. 9 is a figure illustrating a modification of the storage unit 11 and the arithmetic unit 12 according to the first embodiment.

FIG. 9 is a figure illustrating an example of a combination of the internal configuration of the storage unit 11 shown in FIG. 7 and a configuration of the arithmetic unit 12 shown in FIG. 8.

In other words, the storage unit 11 is configured to include one storage element 120, and the arithmetic unit 12 is configured to include a selector 102.

The storage element 120 is connected to the inputs of the operation unit 100, 101. The outputs of the operation unit 100, 101 are connected to the selector 102. The output of the selector 102 is connected to the storage element 120.

In the explanation below, operation of the storage unit 11 having the internal configuration as shown in FIG. 7 will be explained.

The storage element 120 reads data in accordance with the read/write control information provided from the control unit 13, and outputs the data to the operation unit 100 and the operation unit 101. The operation unit 100, 101 may respectively output different pieces of data, or may output the same pieces of data.

The arithmetic unit 12 outputs the operation results of the operation unit 100, 101 to the selector 102. The selector 102 receives an operation result selection signal included in the control information provided from the control unit 13 and the operation results of operation unit 100, 101, selects one of the operation results specified by the operation result selection signal, and outputs- the operation result. The storage element 120 receives the output of the selector 102 and the read/write control information provided from the control unit 13, and writes the output of the selector 102 in accordance with the read/write control information.

Since the internal configurations of the storage unit 11 and the arithmetic unit 12 are configured as described above, only one of the arithmetic processings performed by the operation unit 100, 101 of the arithmetic unit 12 is enabled, and the power consumption can be reduced by halting signal transition of the disabled arithmetic unit. As described above, the storage element 120 is shared by the operation unit 100, 101. Therefore, the size of the storage unit can be reduced, and the power consumption can be reduced.

Although the arithmetic unit 12 according to the first embodiment does not include a register for temporarily storing data, an intermediate result of operation, a final result, and the like, the arithmetic unit 12 may be configured to include a prefetch register for storing a result output in a previous cycle in order to reduce a critical path.

[Second Embodiment]

A semiconductor device according to a second embodiment of the present invention includes a processing unit and a storage unit, and is connected to an external device as is the case with semiconductor device 1 of FIG. 1. The processing unit includes an arithmetic unit and a control unit. The semiconductor device performs arithmetic processing in synchronization with a clock signal having a constant clock frequency.

Figure 10:
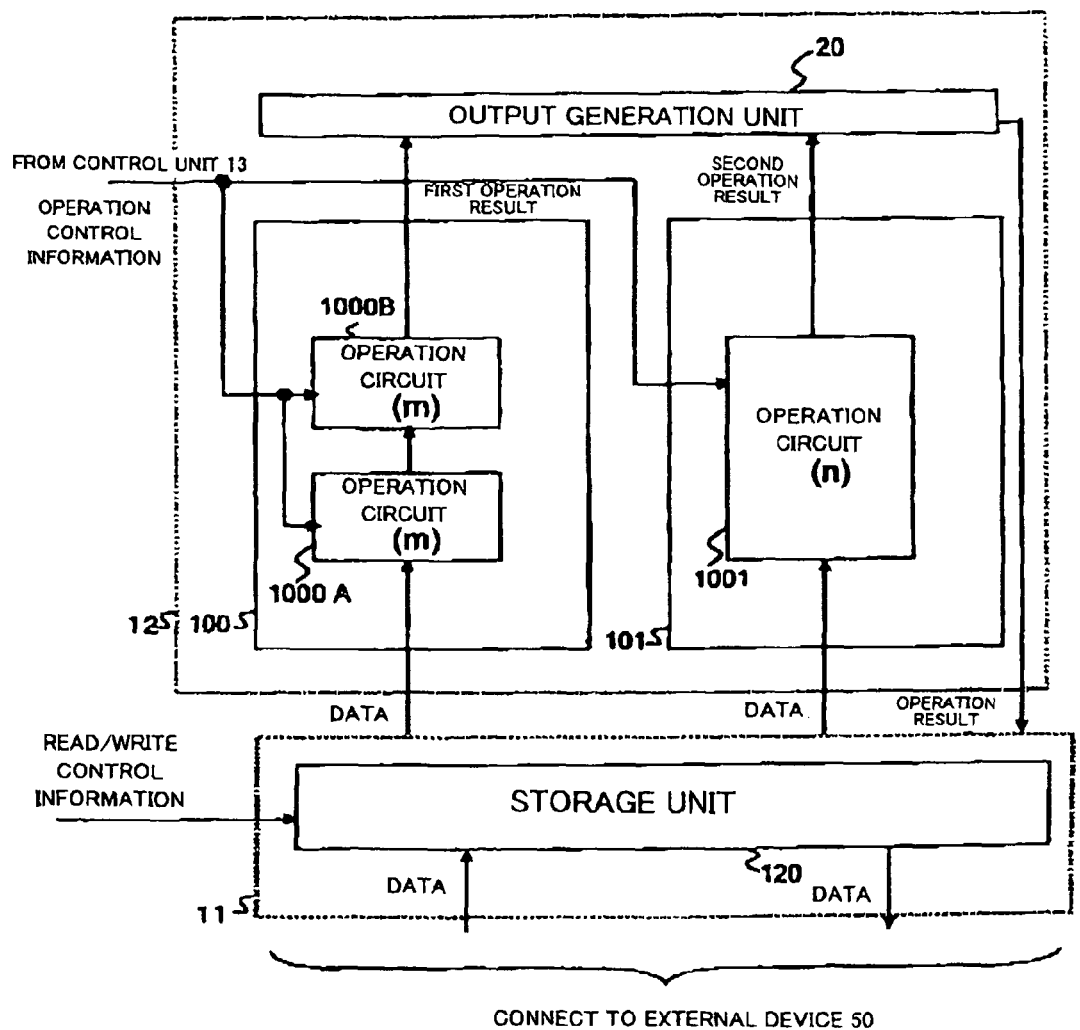
FIG. 10 is a figure illustrating the storage unit 11 and the arithmetic unit 12 according to a second embodiment.

FIG. 10 is a figure illustrating a detailed configuration of an arithmetic unit 12 and a storage unit 11 in the semiconductor device according to the second embodiment of the present invention.

As shown in FIG. 10, the arithmetic unit 12 is different from the semiconductor device according to the first embodiment in that the arithmetic unit 12 further includes an output generation unit 20. The configuration other than the above is the same as the configuration of the semiconductor device according to the first embodiment. Similarly to the configuration shown in FIGS. 7 and 9, the storage unit 11 includes one storage element 120.

When the arithmetic unit 12 receives data from the storage unit 11, and receives operation control information from the control unit 13, a determination is made as to whether the operation control information is effective or not. When the operation control information is determined to be effective, the arithmetic unit 12 performs arithmetic processing on the data in accordance with the operation control information, and outputs an operation result (output data) to the storage unit 11.

The arithmetic unit 12 includes an operation unit 100 and an operation unit 101. The operation unit 100 includes an operation circuit 1000A and an operation circuit 1000B.

When the operation unit 100 and the operation unit 101 respectively receive first data and second data from the storage unit 11, the operation unit 100 and the operation unit 101 execute arithmetic processings, and output a first operation result and a second operation result to the output generation unit 20.

The output generation unit 20 receives the first operation result provided from the operation unit 100 and the second operation result provided from the operation unit 101, and generates an operation result (output data) in accordance with the operation control information. The operation result (output data) is output to the storage unit 11.

The output generation unit 20 may output only one of the first operation result provided from the operation unit 100 and the second operation result provided from the operation unit 101 as the operation result (output data), or may, output both of them.

For example, the output generation unit 20 may change a content of output using one of the operation results. More specifically, when one of the operation results (for example, first operation result) is true, the other of the operation results (for example, second operation result) is output. When one of the operation results (for example, first operation result) is false, neither first operation result nor second operation result is output. As described above, processing for changing the content of output using one of the operation results as a condition includes conditional branch processing.

An example of conditional branch processing includes processing for executing If clause (If to then to Else to IfEnd). If clause is an instruction for performing processing subsequent to "Then", when the conditional branch is "true" and for performing processing subsequent to "Else", when the conditional branch is "false". The format of the If cause is "If condition Then processing for true IfEnd". The termination command of this If clause is "IfEND".

When the semiconductor device according to the second embodiment performs conditional branch processing, for example, the first operation result is used to determine whether the conditional branch is "true" or "false", and the second operation result is used as a processing result subsequent to "Then", i.e., processing performed when the conditional branch is "true". Then, no processing is done as the processing subsequent to "Else", i.e., processing performed when the conditional branch is "false". In this case, the output generation unit 20 determines whether the conditional branch is "true" or "false" from the first operation result. When the conditional branch is determined to be "true", the second operation result is output. When the conditional branch is determined to be "false", neither first operation result nor second operation result is output.

As described above, the semiconductor device according to the second embodiment simultaneously performs the processing for determining whether the conditional branch is "true" or "false" and the processing executed when the conditional branch is determined to be "true", thus improving the speed of the conditional branch processing.

In the above example, when the first operation result is determined to be "true", the second operation result is output. Alternatively, both of the first operation result and the second operation result may be output. Still alternatively, the second operation result may be used for determining the conditional branch, and when the conditional branch is determined to be "true" from the second operation result, the first operation result may be output.

When the first operation result is determined to be "false", neither first operation result nor second operation result is output. Alternatively, the first operation result may be output.

Still alternatively, when the first operation result is determined to be "false", the second operation result may be output, and when the first operation result is determined to be "true", neither first operation result nor second operation result may be output.

Still alternatively, the first operation result is determined to be "true", the first operation result may be output, and when the first operation result is determined to be "false", and the second operation result may be output.

In the above example, the conditional branch processing is explained as an example of processing for changing the content of output using one of the operation results as a condition. However, the processing is not limited to the conditional branch processing. For example, the following method is possible. Multiple arithmetic units may be provided, and the arithmetic units may execute processings for different conditions. Only one result according to the conditional result may be written back to the storage unit. As described above, when multiple arithmetic units execute conditional determination processings, the cycles needed for the conditional determination can be reduced.

Only one of the operation unit 100 and the operation unit 101 may operate in accordance with the content output from the output generation unit 20, or both of the two units may operate at a time. For example, when the output generation unit 20 outputs only the operation result of only one of the operation unit 100 and the operation unit 101, the operation control information may not be sent to the arithmetic unit that does not output the operation result, and the operation may be halted. In this case, configuration information can be reduced, and the power consumption can be reduced.

In addition, the semiconductor device according to the second embodiment achieves the same effects as the semiconductor device according to the first embodiment.

[Third Embodiment]

Figure 11:
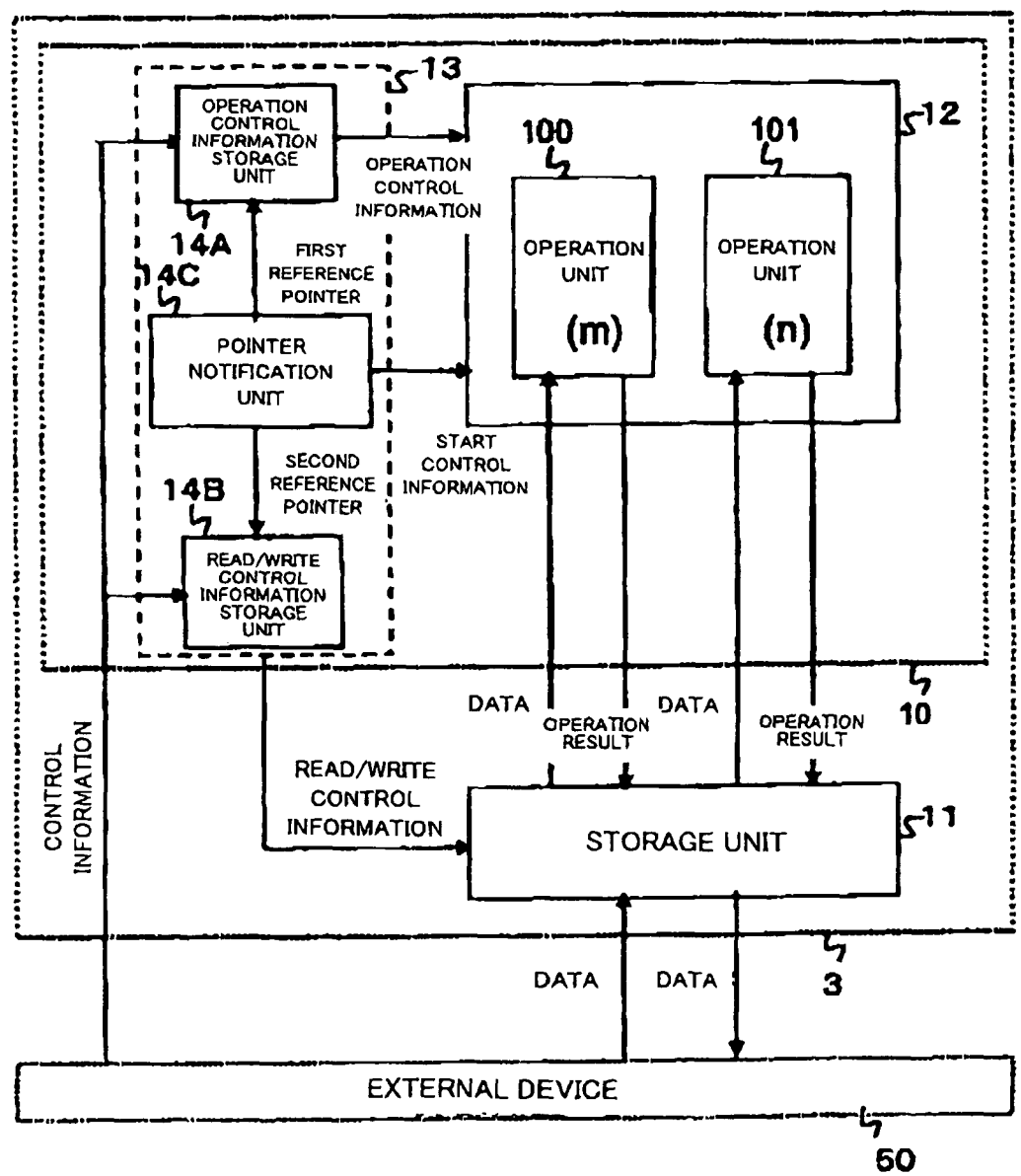
FIG. 11 is a block diagram illustrating an overall configuration of a semiconductor device according to a third embodiment.

FIG. 11 is a figure illustrating a configuration of a semiconductor device according to the third embodiment of the present invention.

As shown in FIG. 11, a semiconductor device according to the third embodiment is configured such that the configuration of the control unit is shown in a more concrete manner than the semiconductor device according to the first embodiment.

The control unit 13 includes an operation control information storage unit 14A, a read/write control information storage unit 14B, and a pointer notification unit 14C.

The pointer notification unit 14C notifies a first reference pointer to the operation control information storage unit 14A, and notifies a second reference pointer to the read/write control information storage unit 14B. The pointer notification unit 14C notifies a start control signal to the arithmetic unit 12. When the arithmetic unit 12 receives the start control signal, it starts execution of arithmetic processing.

The read/write control information storage unit 14A can receive operation control information from the external device 50 and store the operation control information in advance. Then, when the read/write control information storage unit 14A receives the first reference pointer from the pointer notification unit 14C, the read/write control information storage unit 14A notifies the operation control information to the arithmetic unit 12 in accordance with the first reference pointer.

The read/write control information storage unit 14B receives operation read/write control information from the external device 50 and store the read/write control information in advance. Then, when the read/write control information storage unit 14B receives the second reference pointer from the pointer notification unit 14C, the read/write control information storage unit 14B notifies the read/write control information to the arithmetic unit 11 in accordance with the second reference pointer.

The semiconductor device according to the third embodiment can transfer a certain amount of operation control information and read/write control information provided from the external device 50 to the operation control information storage unit 14A and the read/write control information storage unit 14B, and notify the operation control information and the read/write control information to the arithmetic unit 12 and the storage unit 11 at an appropriate point in time.

In addition, the semiconductor device according to the third embodiment achieves the same effects as the semiconductor device according to the first embodiment.

[Fourth Embodiment]

Figure 12:
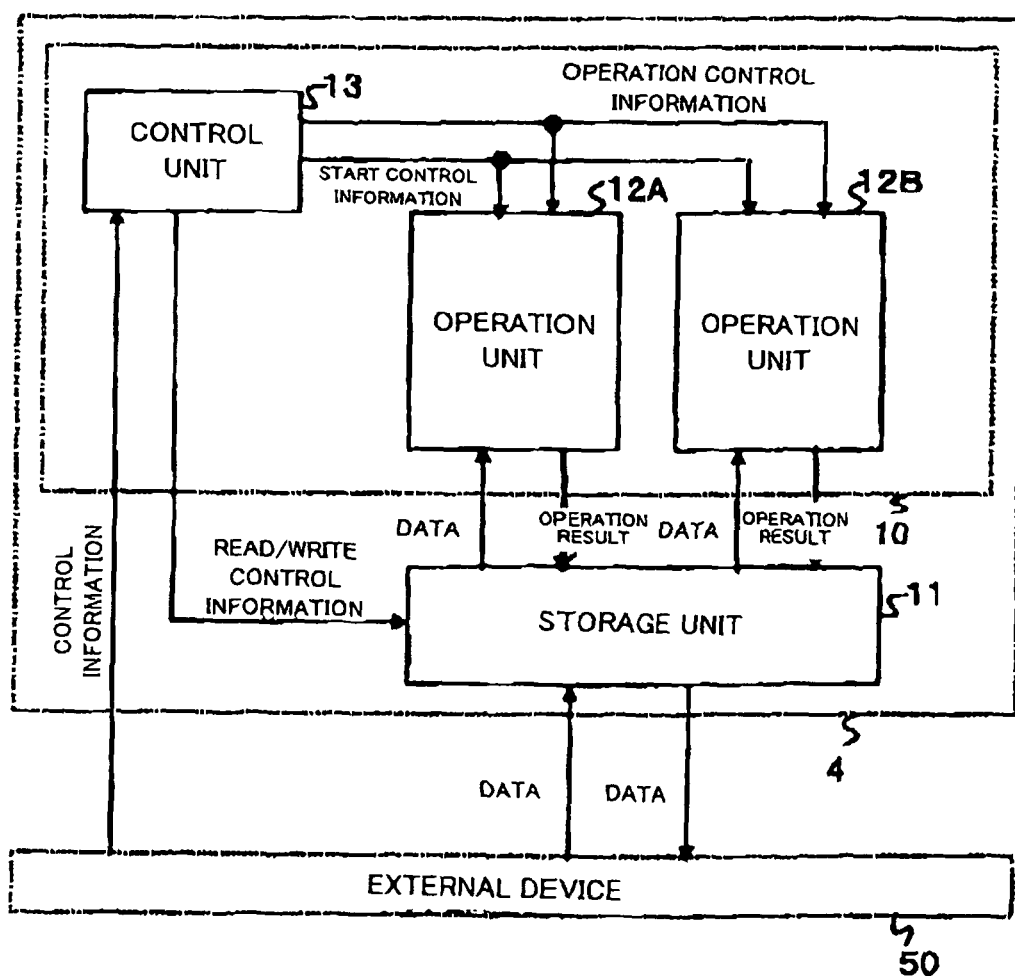
FIG. 12 is a block diagram illustrating an overall configuration of a semiconductor device according to a fourth embodiment.

FIG. 12 illustrates a configuration of a semiconductor device according to the fourth embodiment of the present invention. The semiconductor device according to the fourth embodiment is different from the semiconductor device according to the first embodiment in that a processing unit 10 includes two operation unit 12A and 12B.

The arithmetic unit 12A and the arithmetic unit 12B have the same configuration as the configuration of the arithmetic unit 12 explained in the first embodiment as shown in FIG. 4. The internal configurations of the arithmetic unit 12A and the arithmetic unit 12B are not shown here. In the following explanation, the reference numerals of the constituent elements in FIG. 4 are substituted.

The arithmetic unit 12A includes two operation units, i.e., an operation unit 100A and an operation unit 101A.

In the operation unit 100A, 101A, multiple operation circuits may be provided in series as long as a summation of delay indexes of the operation circuits connected directly is not more than the reference value Z.

The operation unit 100A includes first to M-th (M is an integer of 2 or more) operation circuits having delay indexes $m_1, \ldots, m_M$ ($m_1, \ldots, m_M$ are natural numbers which are equal to or more than one but less than k), and the operation unit 101A includes first to N-th (N is an integer of 1 or more, and N<M) operation circuits having delay indexes $n_1, \ldots, n_N$ ($n_1, \ldots, n_N$ are natural numbers of k or more).

However, a summation of the delay indexes of the operation circuits provided in the operation unit 100A ($m_1+ \ldots +m_M$) and a summation of the delay indexes of the operation circuits provided in the operation unit 101A ($n_1+ \ldots +n_N$) are equal to or less than the reference value Z. For example, the delay defined based on the summation of the delay indexes of the operation circuits provided in the operation unit 100A ($m_1+ \ldots +m_M$) and the delay defined based on the summation of the delay indexes of the operation circuits provided in the operation unit 101A ($n_1+ \ldots +n_N$) are equal to or less than the cycle of the clock signal (reference value Z).

The arithmetic unit 12B includes two operation units, i.e., an operation unit 100B and an operation unit 101B.

In the operation unit 100B, 101B, multiple operation circuits may be provided in series as long as a summation of delay indexes of the operation circuits connected directly is not more than the reference value Z.

The operation unit 100B includes first to R-th (R is an integer of 2 or more) operation circuits having delay indexes $r_1, \ldots, r_R$ ($r_1, \ldots, r_R$ are natural numbers which are equal to or more than one but less than j (j is an integer of 1 or more)), and the operation unit 101B includes first to S-th (S is an integer of 1 or more, and S<R) operation circuits having delay indexes $s_1, \ldots, s_S$ ($s_1, \ldots, s_S$ are natural numbers of j or more).

However, a summation of the delay indexes of the operation circuits provided in the operation unit 100B ($r_1+ \ldots +r_R$) and a summation of the delay indexes of the operation circuits provided in the operation unit 101B ($s_1+ \ldots +s_S$) are equal to or less than the reference value Z. For example, the delay defined based on the summation of the delay indexes of the operation circuits provided in the operation unit 100 ($r_1+ \ldots +r_R$) and the delay defined based on the summation of the delay indexes of the operation circuits provided in the operation unit 101 ($s_1+ \ldots +s_S$) are equal to or less than the cycle of the clock signal (reference value Z).

When the control unit 13 of the semiconductor device according to the fourth embodiment receives the control information from the external device 50, the control unit 13 notifies a start control signal as well as first operation control information and second operation control information to the arithmetic unit 12A, and notifies a start control signal as well as third operation control information and fourth operation control information to the arithmetic unit 12B. When the arithmetic unit 12A receives the start control signal, the operation unit 100A executes arithmetic processing on the data read from the storage unit 11 in accordance with the first operation control information, and the operation unit 101A executes arithmetic processing on the data read from the storage unit 11 in accordance with the second operation control information. When the arithmetic unit 12B receives the start control signal, the operation unit 100E executes arithmetic processing on the data read from the storage unit 11 in accordance with the third operation control information, and the operation unit 101B executes arithmetic processing on the data read from the storage unit 11 in accordance with the fourth operation control information. Then, the operation unit 100A, the operation unit 101A, the operation unit 100B, and the operation unit 101E output operation results obtained by executing the respective arithmetic processings to the storage unit 11.

In the semiconductor device according to the fourth embodiment, the processing unit 10 may include three or more arithmetic units. Even in this case, the semiconductor device according to the fourth embodiment is configured such that a summation of delay indexes of the operation circuits of the operation unit provided in each arithmetic unit is not more than the reference value Z.

Further, according to the semiconductor device according to the fourth embodiment, each arithmetic unit includes the arithmetic element for processing operation of a low degree of complexity and the arithmetic element for processing operation of a high degree of complexity, and the arithmetic element for processing operation of a high degree of complexity and the arithmetic element for processing operation of a high degree of complexity have different numbers of operation circuits. Therefore, the execution times of various operation codes are balanced, and the efficiency of use of the operation devices can be improved. Since the operation units are made in each arithmetic unit within the previously defined delay index Z, the clock frequency at which the semiconductor device operates can be ensured.

[Fifth Embodiment]

Figure 13:
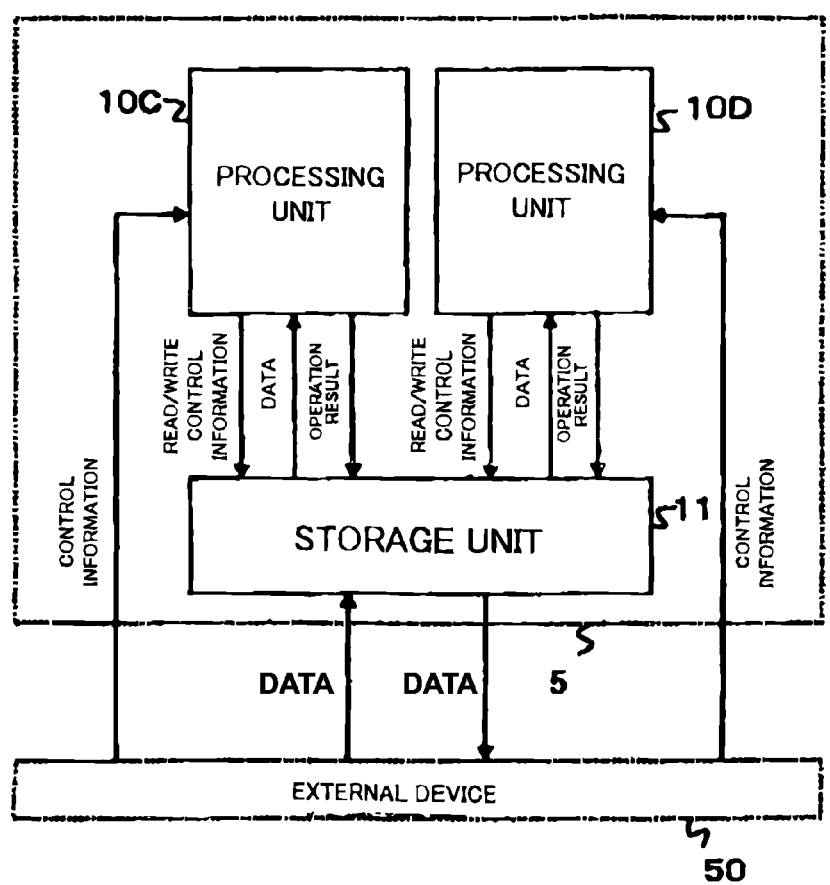
FIG. 13 is a block diagram illustrating an overall configuration of a semiconductor device according to a fifth embodiment.

FIG. 13 illustrates a configuration of a semiconductor device according to the fifth embodiment of the present invention. A semiconductor device according to the fifth embodiment is different from the semiconductor device according to the first embodiment in that the semiconductor device includes two processing units (processing units 10C and 10D).

The processing unit 10C and the processing unit 10D have the same configuration as the processing unit 10 as shown in FIG. 1. The internal configurations of the processing unit 10C and the processing unit 10D are not shown here. In the following explanation, the reference numerals of the constituent elements in FIG. 1 are substituted.

The processing unit 10C includes a control unit 13C and an arithmetic unit 12C.

The arithmetic unit 12C includes two operation units, i.e., an operation unit 100C and an operation unit 101C. The arithmetic unit 12C has the same configuration as the arithmetic unit 12 as shown in FIG. 4. The arithmetic unit 12C is not shown here. In the following explanation, the reference numerals of the constituent elements in FIG. 4 are substituted.

In the operation unit 100C, 101C, multiple operation circuits may be provided in series as long as a summation of delay indexes of the operation circuits connected directly is not more than the reference value Z.

The operation unit 100C includes first to M-th (M is an integer of 2 or more) operation circuits having delay indexes $m_1, \ldots, m_M$ ($m_1, \ldots, m_M$ are natural numbers which are equal to or more than one but less than k), and the operation unit 101D includes first to N-th (N is an integer of 1 or more, and N<M) operation circuits having delay indexes $n_1, \ldots, n_N$ ($n_1, \ldots, n_{Nf}$ are natural numbers of k or more).

However, a summation of the delay indexes of the operation circuits provided in the operation unit 100C ($m_1 + \ldots + m_M$) and a summation of the delay indexes of the operation circuits provided in the operation unit 101C ($n_1 + \ldots + n_N$) are equal to or less than the reference value Z. For example, the delay defined based on the summation of the delay indexes of the operation circuits provided in the operation unit 100C ($m_1 + \ldots + m_M$) and the delay defined based on the summation of the delay indexes of the operation circuits provided in the operation unit 101C ($n_1 + \ldots + n_N$) are equal to or less than the cycle of the clock signal (reference value Z).

The arithmetic unit 12D includes two operation unit, i.e., an operation unit 100D and an operation unit 101D.

In the operation unit 100D, 101D, multiple operation circuits may be provided in series as long as a summation of delay indexes of the operation circuits connected directly is not more than the reference value Z.

The processing unit 10D includes a control unit 13D and an arithmetic unit 12D. The arithmetic unit 12D has the same configuration as the arithmetic unit 12 as shown in FIG. 4. The arithmetic unit 12D is not shown here. In the following explanation, the reference numerals of the constituent elements in FIG. 4 are substituted.

The arithmetic unit 12D includes two operation unit, i.e., an operation unit 100D and an operation unit 101D.

The operation unit 100D includes first to T-th (T is an integer of 2 or more) operation circuits having delay indexes $t_1, \ldots, t_T$ ($t_1, \ldots, t_T$ are natural numbers which are equal to or more than one but less than h (h is an integer of 1 or more)), and the operation unit 101D includes first to U-th (U is an integer of 1 or more, and U<T) operation circuits having delay indexes $u_1, \ldots, u_U$ ($u_1, \ldots, u_U$ are natural numbers of h or more).

However, a summation of the delay indexes of the operation circuits provided in the operation unit 100D ($t_1 + \ldots + t_T$) and a summation of the delay indexes of the operation circuits provided in the operation unit 101D ($u_1 + \ldots + u_U$) are equal to or less than the reference value Z. For example, the delay defined based on the summation of the delay indexes of the operation circuits provided in the operation unit 100 ($t_1 + \ldots + t_T$) and the delay defined based on the summation of the delay indexes of the operation circuits provided in the operation unit 101 ($u_1 + \ldots + u_U$) are equal to or less than the cycle of the clock signal (reference value Z).

In the semiconductor device 5 according to the present embodiment, when the control unit 13C receives the first control information from the external device 50, the control unit 13C notifies the start control signal as well as the first operation control information and the second operation control information to the arithmetic unit 12C. When the control unit 13D receives the second control information from the external device 50, the control unit 13D notifies the start control signal as well as the fifth operation control information and the sixth operation control information to the arithmetic unit 12D. When the arithmetic unit 12C receives the start control signal, the operation unit 100C executes arithmetic processing on the data read from the storage unit 11 in accordance with the first operation control information, and the operation unit 101C executes arithmetic processing on the data read from the storage unit in accordance with the second operation control information. When the arithmetic unit 12D receives the start control signal, the operation unit 100D executes arithmetic processing on the data read from the storage unit 11 in accordance with the fifth operation control information, and the operation unit 1010 executes arithmetic processing on the data read from the storage unit 11 in accordance with the sixth operation control information. Then, the arithmetic element 10C and the arithmetic element 10D output operation results obtained by executing the arithmetic processings to the storage unit 11.

It should be noted that each of the processing units 10C, 10D may include multiple arithmetic units.

The semiconductor device according to the fifth embodiment may include, three on more processing units. Even in this case, the semiconductor device 5 is configured such that a summation of delay indexes of the operation circuits of the operation unit provided in each arithmetic unit is not more than the reference value Z.

Further, according to the semiconductor device according to the fifth embodiment, each arithmetic unit includes the arithmetic element for processing operation of a low degree of complexity and the arithmetic element for processing operation of a high degree of complexity, and the arithmetic element for processing operation of a low degree of complexity and the arithmetic element for processing operation of a high degree of complexity have different numbers of operation circuits. Therefore, the execution times of various operation codes are balanced, and the efficiency of use of the operation devices can be improved. Since the operation units are made in each arithmetic unit within the previously defined delay index Z, the clock frequency at which the semiconductor device 4 operates can be ensured.

While certain embodiments have been described, these embodiments have been presented by way of example only, and are not intended to limit the scope of the inventions. Indeed, the novel embodiments described herein may be embodied in a variety of other forms: furthermore, various omissions, substitutions and changes in the form of embodiments described herein may be made without departing from the spirit of the inventions. The accompanying claims and their equivalents are intended to cover such forms or modifications as would fall within the scope and spirit of the inventions.

What is claimed is:

1. A semiconductor device including a plurality of operation circuits executing operation in synchronization with a clock signal comprising:
a control unit for outputting first operation control information and second operation control information for controlling operation executed by the plurality of operation circuits;
a storage unit for storing first data and second data;
a first operation unit operating in synchronization with the clock signal, performing operation on the first data in accordance with the first operation control information, and outputting third data; and
a second operation unit operating in synchronization with the clock signal, performing operation on the second data in accordance with the second operation control information, and outputting fourth data,
the first operation unit including first to M-th (M is an integer of 2 or more) operation circuits connected in series, such that an m+1-th (m is an integer equal to or greater than 1 and equal to or less than M−1) operation circuit is configured to perform operation on an operation result provided by an m-th operation circuit,
delay indexes representing amounts of delays of the first to M-th operation circuits as $m_1, \ldots, m_M$ ($m_1, \ldots, m_M$ are natural numbers), respectively,
the second operation unit including at least an operation circuit, the delay index of which represents the amount of delay as n (n is an integer of 1 or more),
wherein a delay defined based on a summation of delay indexes of the operation circuits provided in the first operation unit ($m_1 + \ldots + m_M$) and a delay defined based on the delay index n of the operation circuits provided in the second operation unit are equal to or less than a reference value Z defined in advance based on a cycle of the clock signal.

2. The semiconductor device according to claim 1, wherein the delay indexes $m_1, \ldots, m_M$ representing amounts of delays of the first to M-th operation circuits provided in the first operation unit are less than a threshold value k respectively and the delay index n representing amounts of delays of the operation circuits provided in the second operation unit is equal to or greater than the threshold value k.

3. The semiconductor device according to claim 2, wherein each of the operation circuits comprises a plurality of cascade-connected logic gates.

4. The semiconductor device according to claim 3, wherein the number of logic gates in the operation circuits provided in the first operation unit is less than the number of logic gates in the operation circuits provided in the second operation unit.

5. The semiconductor device according to claim 4, wherein the operation circuits provided in the first operation unit are configured to execute basic arithmetic-logic operation including one or more of logical addition, logical multiplication, and addition/subtraction, and
the operation circuits provided in the second operation unit are configured to execute more complicated operation than the operation executed by the operation circuits provided in the first operation unit including one or more of multiplication, division, and remainder.

6. The semiconductor device according to claim 1, wherein the storage unit includes a first storage unit storing data on which the first operation unit performs operation and a second storage unit storing data on which the second operation unit performs operation, the first operation unit reads data stored in the first storage unit, and writes the third data to one of or both of the first storage unit and the second storage unit, and
the second operation unit reads data stored in the second storage unit, and writes the fourth data to one of or both of the first storage unit and the second storage unit.

7. The semiconductor device according to claim 1, wherein the storage unit includes a storage unit for storing data on which the first operation unit and the second operation unit perform operation,
the semiconductor device further comprises a selector capable of receiving both of an operation result of the first operation unit and an operation result of the second operation unit, the selector selecting one of the third data and the fourth data, and
one of the third data and the fourth data selected by the selector is written to the storage unit.

8. The semiconductor device according to claim 1,
wherein the control unit outputs third operation control information and fourth operation control information,
the storage unit stores fifth data and sixth data,
the semiconductor device further comprises:
a third operation unit operating in synchronization with the clock signal, performing operation on the fifth data in accordance with the third operation control information, and outputting seventh data; and
a fourth operation unit operating in synchronization with the clock signal, performing operation on the sixth data in accordance with the fourth operation control information, and outputting eighth data,
the third operation unit including first to R-th (R is an integer of 2 or more) operation circuits connected in series, such that an r+1-th (r is an integer equal to or greater than 1 and equal to or less than R−1) operation circuit is configured to perform operation on an operation result provided by an r-th operation circuit,
delay indexes representing amounts of delays of the first to R-th operation circuits as $r_1, \ldots, r_R$ ($r_1, \ldots, r_R$ are natural numbers), respectively,
the fourth operation unit including at least an operation circuit, the delay index which represents the amount of delay as s (s is an integer of 1 or more),
wherein a delay defined based on a summation of delay indexes of the operation circuits provided in the third operation unit ($r_1 + \ldots + r_R$) and a delay defined based on the delay index s of the operation circuits provided in the fourth operation unit are equal to or less than the reference value Z defined in advance based the cycle of the clock signal.

9. The semiconductor device according to claim 8, wherein the delay index of the operation circuits provided in the third operation unit is less than the delay index of the operation circuits provided in the fourth operation unit.

10. The semiconductor device according to claim 9, wherein each of the operation circuits provided in the third operation unit and the fourth operation unit comprises a plurality of cascade-connected logic gates.

11. The semiconductor device according to claim 10, wherein the number of logic gates in the operation circuits provided in the third operation unit is less than the number of logic gates in the operation circuits provided in the fourth operation unit.

12. The semiconductor device according to claim 11, wherein the operation circuits provided in the third operation unit are configured to execute basic arithmetic-logic operation including one or more of logical addition, logical multiplication, and addition/subtraction, and the operation circuits provided in the fourth operation unit are configured to execute more complicated operation than the operation executed by the operation circuits provided in the third operation unit including one or more of multiplication, division, and remainder.

13. The semiconductor device according to claim 1, wherein the storage unit stores ninth data and tenth data, the semiconductor device further comprises:
a second control unit for outputting fifth operation control information and sixth operation control information for controlling operation executed by the plurality of operation circuits;
a fifth operation unit operating in synchronization with the clock signal, performing operation on the ninth data in accordance with the fifth operation control information, and outputting eleventh data; and
a sixth operation unit operating in synchronization with the clock signal, performing operation on the tenth data in accordance with the sixth operation control information, and outputting twelfth data,
the fifth operation unit including first to T-th (T is an integer of 2 or more) operation circuits connected in series, such that a t+1-th (t is an integer equal to or greater than 1 and equal to or less than T−1) operation circuit is configured to perform operations on an operation result provided by a t-th operation circuit,
delay indexes representing amounts of delays of the first to T-th operation circuits as $t_1, \ldots, t_T$ ($t_1, \ldots, t_T$ are natural numbers), respectively,
the sixth operation unit including at least an operation circuit whose delay index representing the amount of delay as u (u is an integer of 1 or more),
wherein a delay defined based on a summation of delay indexes of the operation circuits provided in the fifth operation unit ($t_1 + \ldots + t_T$) and a delay defined based on the delay index u of the operation circuits provided in the sixth operation unit are equal to or less than the reference value Z defined in advance based on the cycle of the clock signal.

14. The semiconductor device according to claim 13, wherein the delay index of the operation circuits provided in the fifth operation unit is less than the delay index of the operation circuits provided in the sixth operation unit.

15. The semiconductor device according to claim 14, wherein each of the operation circuits provided in the fifth operation unit and the sixth operation unit comprises a plurality of cascade-connected logic gates.

16. The semiconductor device according to claim 15, wherein the number of logic gates in the operation circuits provided in the fifth operation unit is less than the number of logic gates in the operation circuits provided in the sixth operation unit.

17. The semiconductor device according to claim 16, wherein the operation circuits provided in the fifth operation unit are configured to execute basic arithmetic-logic operation including one or more of logical addition, logical multiplication, and addition/subtraction, and
the operation circuits provided in the sixth operation unit are configured to execute more complicated operation than the operation executed by the operation circuits provided in the first operation unit including one or more of multiplication, division, and remainder.

18. A semiconductor device executing arithmetic processing in synchronization with a clock signal comprising:
a control unit for outputting first operation control information and second operation control information for controlling operation executed by a plurality of operation circuits;
a storage unit for storing first data and second data;
a first operation unit operating in synchronization with the clock signal, performing arithmetic processing on the first data in accordance with the first operation control information, and outputting third data; and
a second operation unit operating in synchronization with the clock signal, performing an operation on the second data in accordance with the second operation control information, and outputting fourth data,
the first operation unit including first to M-th (M is an integer of 2 or more) operation circuits being connected in series, the first to M-th operation circuits performing different arithmetic processing respectively in accordance with an operation code, an m-th (m is an integer equal to or greater than 1 and less than or equal to M−1) operation circuit included in the first operation unit performing operation in accordance with an m-th operation code, an m+1-th (m is an integer equal to or greater than 1 and less than or equal to M−1) operation circuit included in the first operation unit performing operation on an operation result provided by the m-th operation circuit in accordance with an m+1-th operation code,
delay indexes representing amounts of delays of the first to M-th operation circuits as $m_1, \ldots, m_M$ ($m_1, \ldots, m_M$ are natural numbers), respectively,
the second operation unit including at least an operation circuit, the delay index of which represents the amount of delay as n (n is an integer of 1 or more), the operation circuit provided in the second operation unit performing different operation in accordance with an operation code described in the second operation control information,
wherein a delay defined based on a summation of delay indexes of the operation circuits provided in the first operation unit ($m_1 + \ldots + m_M$) and a delay defined based on the delay index n of the operation circuits provided in the second operation unit are equal to or less than a cycle of the clock signal respectively, and
the delay indexes $m_1, \ldots, m_M$ representing amounts of delays of the first to M-th operation circuits provided in the first operation unit are less than a threshold value k respectively and the delay index n representing amounts of delays of the operation circuits provided in the second operation unit is equal to or more than the threshold value k.

19. A semiconductor device executing operation in synchronization with a clock signal comprising:
a control unit for outputting first operation control information and second operation control information for controlling operation executed by the plurality of operation circuits;
a storage unit for storing first data and second data;
a first operation unit operating in synchronization with the clock signal, performing operation on the first data in accordance with the first operation control information, and outputting third data; and
a second operation unit operating in synchronization with the clock signal, performing operation on the second data in accordance with the second operation control information, and outputting fourth data,
the first operation unit including first to M-th (M is an integer of 2 or more) operation circuits being connected in series, the first to M-th operation circuits perform different operation respectively in accordance with an operation code, an m-th (m is an integer equal to or greater than 1 and less than or equal to M−1) operation circuit included in the first operation unit performing operation in accordance with an m-th operation code, an m+1-th (m is an integer equal to or greater than 1 and less than or equal to M−1) operation circuit included in the first operation unit performing operation on an operation result provided by the m-th operation circuit in accordance with an m+1-th operation code, delay indexes representing amounts of delays of the first to M-th operation circuits as $m_1, \ldots, m_M$ ($m_1, \ldots, m_M$ are natural numbers), respectively, the second operation unit including first to N-th (N is an integer equal to or greater than 2) operation circuits being connected in series, the first to N-th operation circuits perform different arithmetic processing respectively in accordance with an operation code, an n-th (n is an integer equal to or greater than 1 and less than or equal to N−1) operation circuit included in the second operation unit performing operation in accordance with an n-th operation code described in the first operation control information, an n+1-th (n is an integer equal to or greater than 1 and equal to or less than N−1) operation circuit included in the second operation unit performing operation on an operation result provided by the n-th operation circuit in accordance with an n+1-th operation code described in the first operation control information, delay indexes representing amounts of delays of the first to N-th operation circuits as $n_1, \ldots, n_N$ ($n_1, \ldots, n_N$ are natural numbers), respectively, wherein a delay defined based on a summation of delay indexes of the operation circuits provided in the first operation unit ($m_1 + \ldots + m_M$) and a delay defined based on the delay index of the operation circuits provided in the second operation unit ($n_1 + \ldots + n_N$) are equal to or less than a cycle of the clock signal respectively, and the delay indexes $m_1, \ldots, m_M$ representing amounts of delays of the first to M-th operation circuits provided in the first operation unit are less than a threshold value k respectively and the delay indexes $n_1, \ldots, n_N$ representing amounts of delays of the operation circuits provided in the second operation unit are equal to or more than the threshold value k.

* * * * *